UNITED STATES PATENT OFFICE.

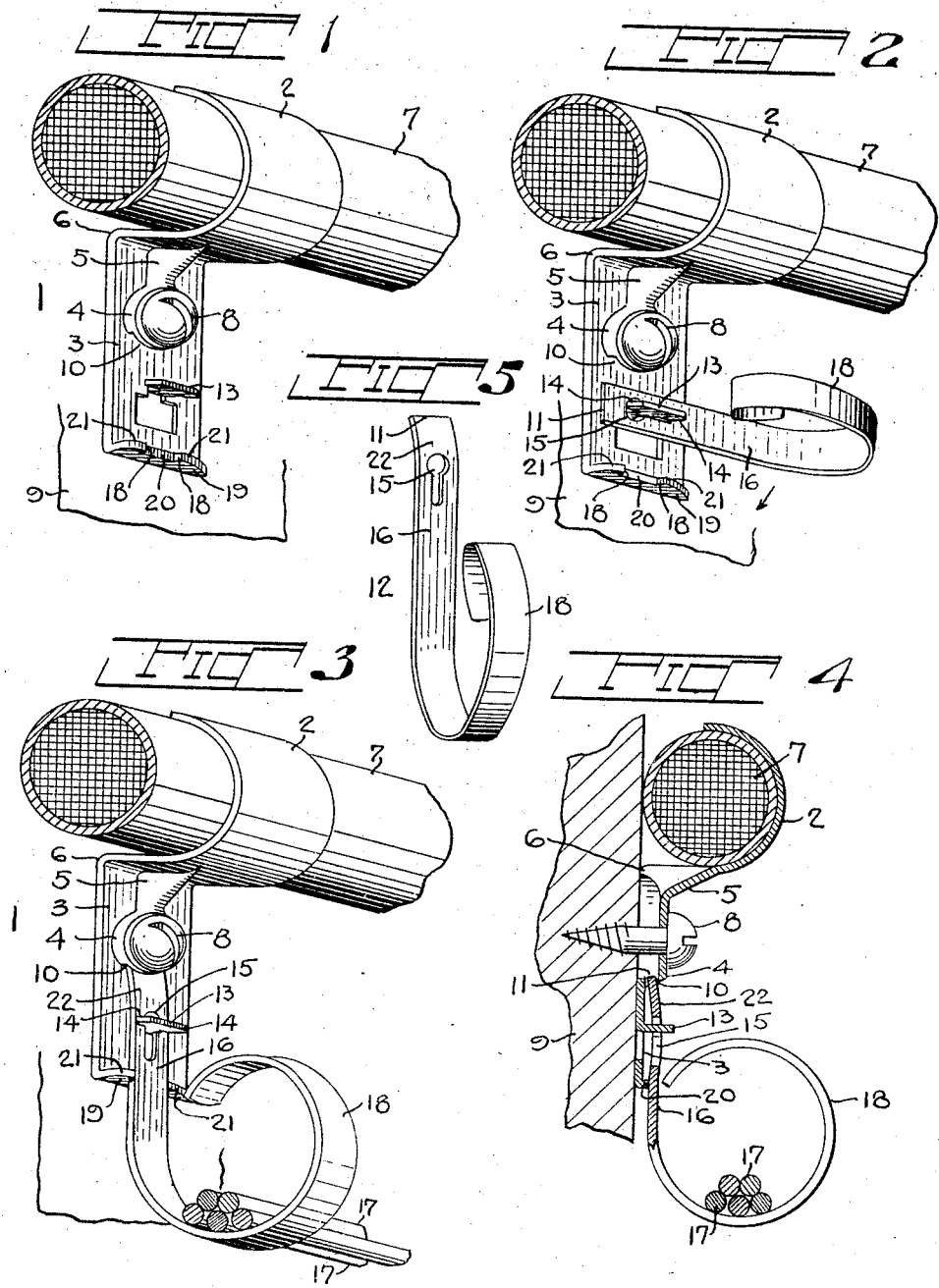

JOHN KARITZKY, OF GARWOOD, NEW JERSEY, ASSIGNOR TO HENRY B. NEWHALL, OF PLAINFIELD, NEW JERSEY, EXECUTOR OF HENRY B. NEWHALL, SR., DECEASED.

CONDUIT OR CABLE CLAMP AND BRIDLE-RING.

1,365,625.  Specification of Letters Patent.  Patented Jan. 11, 1921.

Application filed August 17, 1920. Serial No. 404,163.

*To all whom it may concern:*

Be it known that I, JOHN KARITZKY, a citizen of the United States, residing at Garwood, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp which is preferably formed out of sheet metal and is provided with coöperating surfaces to receive and hold the bridle ring. My invention further relates to bridle rings which are used with my improved conduit and cable clamps.

While my conduit or cable clamp is preferably formed out of pressed sheet material as pressed steel, it may be formed from castings of malleable iron, brass, an alloy, aluminum or any other metal.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1 is a perspective view of my conduit or cable clamp and of a cable which it supports;

Fig. 2 is a perspective view of my conduit or cable clamp, shown in Fig. 1, with my bridle ring in its first attaching position;

Fig. 3 is a perspective view of my conduit or cable clamp and bridle ring in its operative position;

Fig. 4 is a vertical section through the clamp and bridle ring shown in Fig. 3;

Fig. 5 is a perspective view of the preferred form of open bridle ring which I employ.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demands it, my bridle ring may be supported by the same conduit or cable clamp, when the complete combination would be used.

In my invention I form a conduit or cable clamp 1, with a hook 2 and a base 3.

In the preferred form, which I have shown by way of example, the conduit or cable clamp is formed from stamped sheet metal. The boss 4 is struck up from the base 3 and preferably, though not necessarily, a reinforcing shoulder 5 is also struck up connecting the boss 4 with the undersurface of the hook 2. This reinforcing shoulder strengthens the clamp and particularly the meeting surface 6 where the hook 2 joins the base 3. The cable 7 is usually lead covered and very heavy and has a tendency to bend the clamp along the meeting surface 6. Should the clamp give way to these bending strains the entire cable 7 would fall. By striking up the reinforcing shoulder 5 a large part of these bending strains are transmitted directly to the securing screw 8 through the boss 4.

The boss 4, in addition to receiving the securing screw 8 to permit the clamp to be secured to the wall or other suitable support 9, is provided with a slot 10 to receive the end 11 of an open bridle ring 12, Figs. 3, 4 and 5.

I also provide the base 3 with a tongue 13 preferably by striking it up from the base. This tongue is undercut to form the locking shoulders 14, 14.

Whenever it is found that the capacity of the cable 7 is not sufficient to carry the traffic load and it is not deemed economical or expedient to go to the expense of taking down the cable 7 and installing a larger one, it is merely necessary in my invention to attach my bridle ring 12 to the conduit or cable clamp 1.

This can be done by the lineman first bringing the bridle ring into the position shown in Fig. 2 so that the tongue 13 will pass through the elongated slot 15 in the shank 16 of the bridle ring. The shank is then swung down into the position shown in Fig. 3, the end 11 of the shank 16 being received and held in the slot 10 on the boss 4. The shoulders 14, 14 of the tongue 13 engage over the shank as shown in Fig. 3, and prevent the bridle ring from becoming disconnected from the clamp. Runs of bridle wires 17, 17 can then be strung through the open ring 18 of the bridle ring 12.

Preferably, though not necessarily, I provide additional locking means on the base 3 to engage and hold the shank 16 of the bridle ring.

These additional locking means, I have shown by way of example, are locking shoulders 18, 18 formed on the flange 19 by cutting out a slot 20. I preferably provide the flange with inclined or beveled surfaces 21, 21.

Preferably, though not necessarily, the end of the shank 16 is bowed or bent slightly at 22. In attaching the bridle ring the end 11, Fig. 2, is brought into engagement with the base 3. In swinging down the shank 16 from the position shown in Fig. 2 the parts move freely until the shank engages the nearest inclined surface 21 on the flange 19. From that point resistance is met due to the bow 22 in the shank and the fact that the locking shoulders 14, 14 on the tongue 13 have caught over the shank. By further rocking the shank so that it moves up the incline 21 some little resistance is met until the shank comes opposite the cutaway portion 20, when the shank will immediately spring into said cutaway portion 20, and be removably held therein by the locking shoulders 18, 18.

Should it ever be desired to remove the runs of bridle wires 17, 17 and the bridle ring 12 all that is necessary is to pull out the shank 16 from the cutaway portion 20 by pulling out on the open ring 18. As soon as the shank is free from the locking shoulders 18, 18 it can be disconnected from the clamp 1 by swinging it back into the position shown in Fig. 2, or into the opposite position as the bridle ring can be connected or disconnected on either side of the longitudinal axis of the clamp.

It will be seen that in my invention the bridle ring can readily be attached by simple manipulation and without touching the securing screw 8. Further, no tapping or screwthreading of the conduit or cable clamp is required. By using one thickness of metal and avoiding the necessity of providing it with screw-threads I save considerable expense in the manufacture of the article and reduce the amount of metal necessary to make the conduit or cable clamp.

Having thus described this invention in connection with an illustrative embodiment thereof, to the details of which I do not desire to be limited, what is claimed as new and what is desired to secure by Letters Patent is set forth in the appended claims.

What I claim is:—

1. A new article of manufacture comprising a conduit or cable clamp having a hook portion and a base, the base being provided with a boss and a tongue to coöperate with a bridle ring.

2. A new article of manufacture comprising a conduit or cable clamp having a hook portion and a base, the base being provided with a boss having a slot to receive the end of a bridle ring and a tongue to coöperate with a bridle ring.

3. A new article of manufacture comprising a conduit or cable clamp having a hook portion and a base, the base being provided with a boss and a tongue to coöperate with a bridle ring, and additional means on the base to coöperate with the shank of a bridle ring.

4. A new article of manufacture comprising a conduit or cable clamp having a hook portion and a base, the base being provided with a boss and a tongue to coöperate with a bridle ring, and a cutaway flange below the tongue to coöperate with the shank of a bridle ring.

5. A new article of manufacture comprising a conduit or cable clamp formed from sheet metal and bent to form a base and a hook portion, the base being struck up to form a boss extending above the surface of the base, and a tongue struck up from the base and adapted to coöperate with a bridle ring, and a cutaway flange on the base adapted to engage the shank of the bridle ring and prevent it pivoting on the clamp.

JOHN KARITZKY.

Witnesses:
F. W. KARITZKY,
EMIL BETZ.